United States Patent [19]

Kluska et al.

[11] Patent Number: 5,136,121
[45] Date of Patent: Aug. 4, 1992

[54] CABLE TERMINALS

[75] Inventors: Theodore E. Kluska, Fairlawn; Arnold R. Smith, Chester, both of N.J.

[73] Assignee: AT&T Bell Laboratories, Murray Hill, N.J.

[21] Appl. No.: 677,210

[22] Filed: Mar. 29, 1991

[51] Int. Cl.⁵ .......................................... H02G 15/113
[52] U.S. Cl. ............................................ 174/93; 16/85; 174/41; 174/60; 174/92; 220/264; 220/335
[58] Field of Search ................. 174/41, 59, 60, 92, 174/93; 16/85; 220/264, 335

[56] References Cited

U.S. PATENT DOCUMENTS

| | | | |
|---|---|---|---|
| 2,673,760 | 3/1954 | Hawks | 16/85 |
| 2,859,390 | 11/1958 | Baker | 174/59 X |
| 2,996,562 | 8/1961 | Channell et al. | 174/92 |
| 3,836,696 | 9/1974 | Gressitt et al. | 174/41 |
| 4,390,744 | 6/1983 | Suffi et al. | 174/41 |
| 4,535,197 | 8/1985 | Butler | 174/41 |
| 4,647,715 | 3/1987 | Butler | 174/41 |
| 4,694,118 | 9/1987 | Schmidt | 174/41 |
| 4,704,499 | 11/1987 | Faust | 174/92 |
| 4,721,830 | 1/1988 | Dagan et al. | 174/41 |
| 4,822,954 | 4/1989 | Rebers et al. | 174/93 |
| 4,908,482 | 3/1990 | Shimirak et al. | 174/93 |
| 4,988,311 | 1/1991 | Tanzola | 439/404 |
| 4,988,834 | 1/1991 | Birch | 174/93 |
| 4,992,627 | 2/1991 | Mullaney | 174/41 |

*Primary Examiner*—Morris H. Nimmo
*Attorney, Agent, or Firm*—L. H. Birnbaum

[57] ABSTRACT

Disclosed is a cable terminal with improved features. Drop wires are sealed by a flexible sheet with an array of slits provided on a major surface of a pair of plates. The slits are positioned and oriented so that when the plates are in a closed position, the sheet will overlap to produce a pair of angled slits at each drop wire location. The housing forming the terminal block enclosure and a portion of the cable housing is made from a single molded piece with holes for mounting different types of terminal blocks. The terminal block enclosure is covered by a door which provides moisture protection when closed. A spring attached to the door keeps it in an opened position while a craftsperson is working on the blocks. The cable housing includes end pieces which accommodate a number of different sealing options for the cable.

4 Claims, 7 Drawing Sheets

CABLE TERMINALS

BACKGROUND OF THE INVENTION

This invention relates to enclosures for telephone cables.

In a typical aerial terminal, the cable passes through a cable housing, wires from the cable are removed from the sheath within the housing, and these wires are electrically connected to terminal blocks in an adjacent enclosure. Drop wires are coupled to these terminal blocks and extend out of the terminal block enclosure to the customer premises. One of the primary considerations in designing the terminals is to keep out moisture or other contaminants from the environment which can adversely affect the connections. For example, in order to prevent moisture penetration through the openings where drop wires exit or enter the terminal, grommets are usually provided around the openings (see, e.g., U.S. Pat. No. 3,836,696 issued to Gressitt et al). While generally acceptable, such grommets can become distorted over time thereby reducing the effectiveness of the seal.

A further consideration in designing an aerial terminal is to provide some flexibility in the customer's choice of features. For example, present terminals usually provide a molded part including a particular type of terminal block in the enclosure (see U.S. Pat. No. 3,836,696 issued to Gressitt et al). However, customers may desire to utilize different types of terminal blocks without changing the basic design. Further, a customer may desire to utilize a foam seal at the ends of the cable housing, such as that shown in U.S. Pat. No. 4,704,499 issued to Faust, or other types of end configurations, again, without altering the basic design of the aerial terminal.

A door is typically provided to the terminal block enclosure to permit a craftperson to make appropriate connections to the terminals. This door should be moisture proof when closed to prevent degradation to the connections. Also, the door should remain open while work is being done for the convenience of the craftsperson.

SUMMARY OF THE INVENTION

The invention, in one aspect, is a cable terminal comprising a housing, one portion of which is adapted for entrance and exit of drop wires therethrough. The said portion includes a pair of plates with a first and second array of aligned holes therein which form an array for passage of the drop wires therethrough. Sheets of flexible material including a first and second array of slits are positioned with respect to the plates so that the slits of the first array overlap at an angle with corresponding slits in the second array while the slits of both arrays are aligned with the array of holes to permit passage of drop wires therethrough.

In accordance with a further aspect, the invention is a cable terminal comprising a housing, one portion of which defines an enclosure including terminal blocks for electrical connection of cable wires to drop wires. A door is mounted over the enclosure for exposing the terminal blocks when in an opened position and protecting the blocks from moisture when in a closed position. A spring is coupled between the enclosure and a surface of the door such that the spring is in a compressed state when the door is in an opened position and thereby prevents the door from being closed.

In accordance with a still further aspect, the invention is a cable terminal comprising a housing, one portion of which is adapted for enclosing terminal blocks for electrical connection of cable wires to drop wires. The said portion is integrably molded with another portion of the housing adapted for housing a cable, and a wall separates the two portions. Holes are provided in the wall for attaching the terminal blocks thereto and providing passage of wire between the block and cable.

In accordance with yet another aspect, the invention is a cable terminal comprising a housing, one portion of which is adapted for housing a cable. The portion includes cylindrical end pieces with separable top and bottom members. The top and bottom members include a semicylindrical groove such that the end pieces are capable of securing therebetween an additional member selected from the group consisting of a compliant seal, a boot, or an extension member for the cable.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
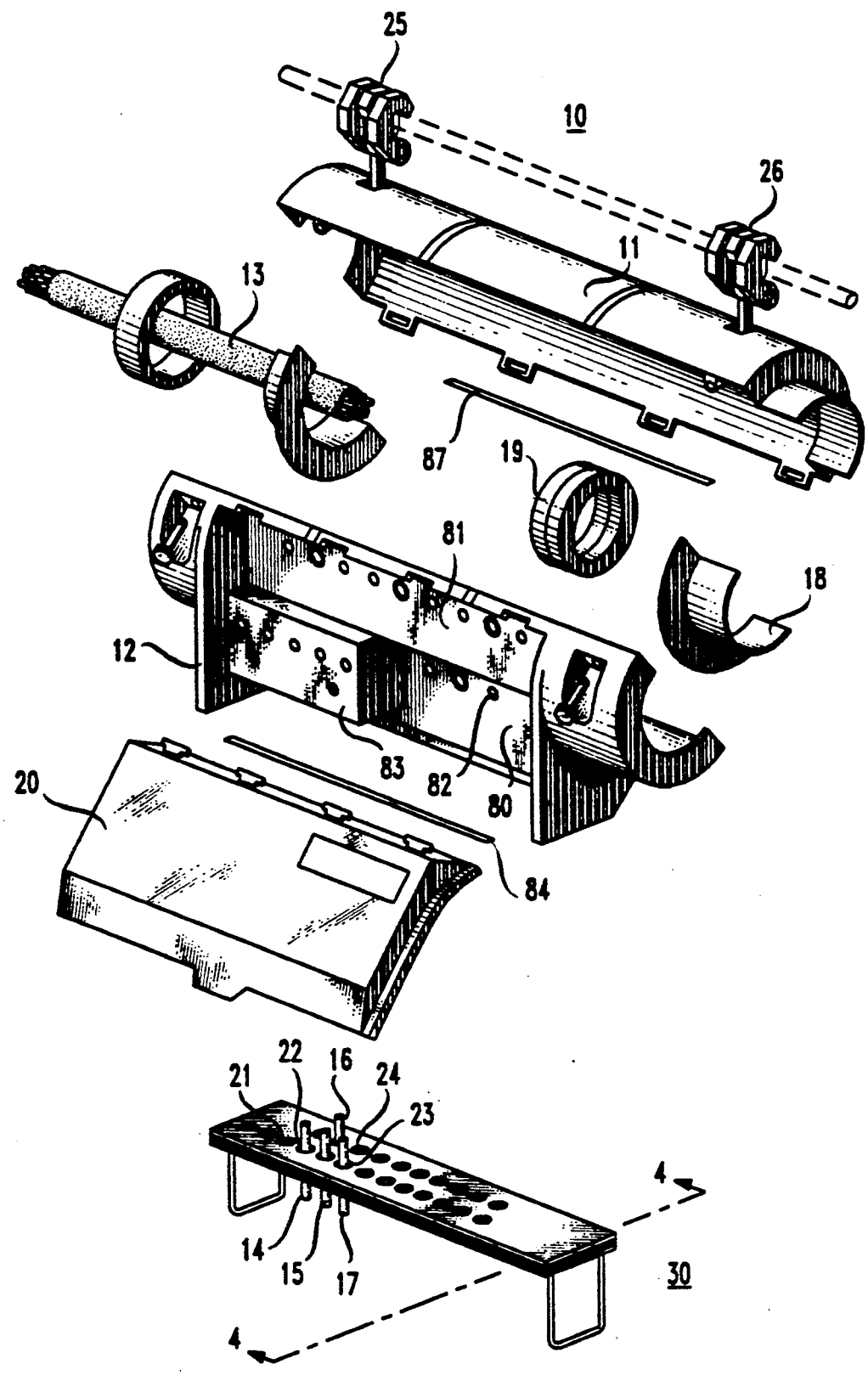
FIG. 1 is an exploded view of a cable terminal in accordance with an embodiment of the invention.
Figure 2:
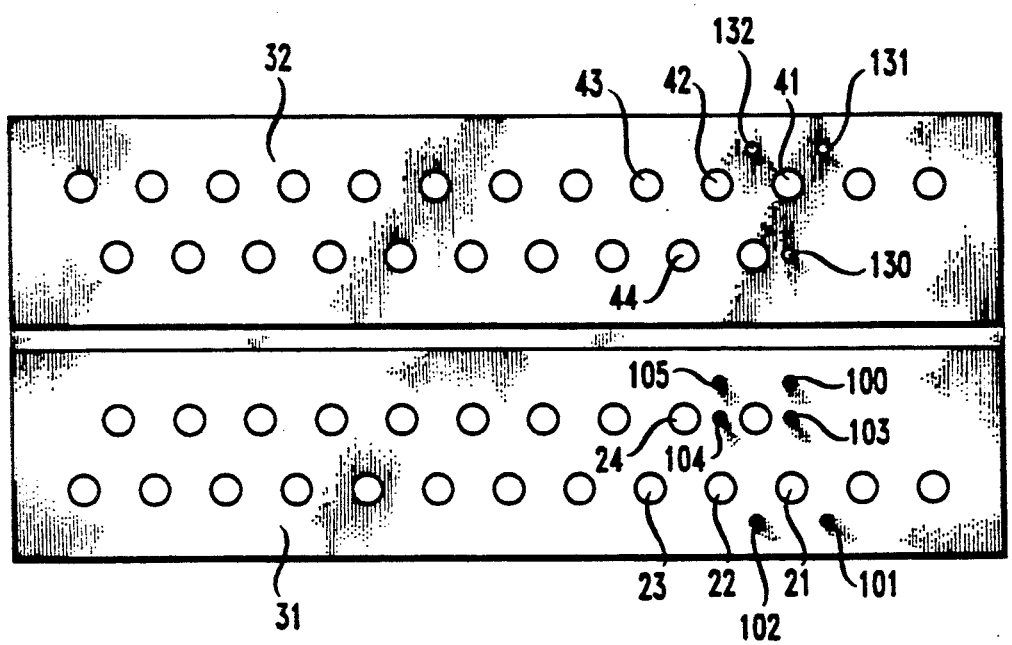
FIG. 2 is a plan view of a portion of said terminal.

One type of cable terminal which includes features of the invention is shown in the exploded view of FIG. 1. The terminal, 10, includes a housing, 11, for the cable, 13, a portion of which is broken off for illustrative purposes. The cable passes through sealing members at both ends of the housing. The sealing members in this example include a hard plastic end piece, 18, and a compliant material 19 which are described, for example, in U.S. Pat. No. 4,704,499 issued to Faust and U.S. Pat. No. 4,988,834 issued to Birch.

The terminal also includes a housing 12 which is molded from one piece of plastic. When attached to housing 11, by means of a rod 87, the housing 12 forms part of the housing for the cable 13. Housings 12 and 13 form a sealed enclosure for the cable by means of a tongue-in-groove fit along the edges of the housings. The housing 12 also includes an enclosure, 80, which is separated from the cable enclose by a wall, 81, including a plurality of holes such as 82. These holes provide passageways for wires connecting the cable wires to terminal blocks such as 83, and also accommodate screw is (not shown) which mount the terminal blocks to the wall 81. The terminal blocks can be any of a variety known in the art, such as that shown in U.S. Pat. No. 4,988,311 issued to Tanzola. One of the advantages of this design is the fact that the customer is free to choose what type and number of terminal blocks to install rather than be stuck with a particular block which is a permanent part of one of the molded pieces of the aerial terminal.

Figure 6:
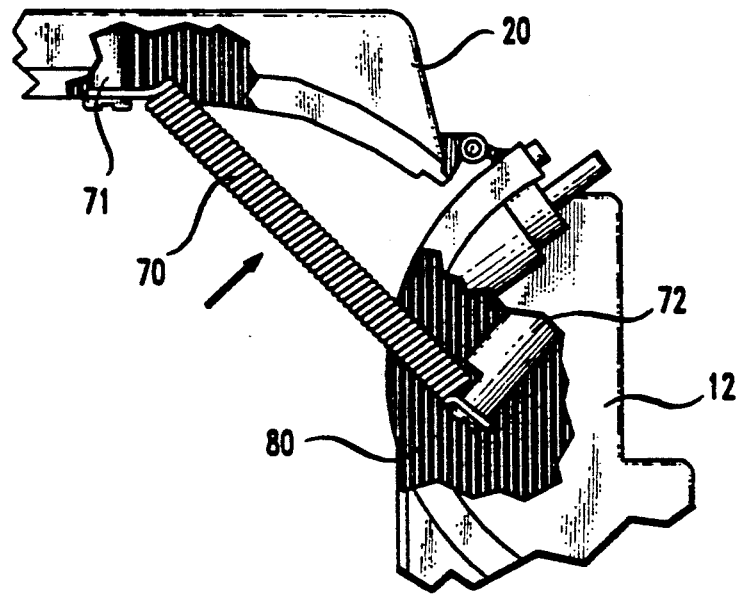
FIGS. 6 and 7 are end views, partly cut away, of a further portion of the terminal.
Figure 7:
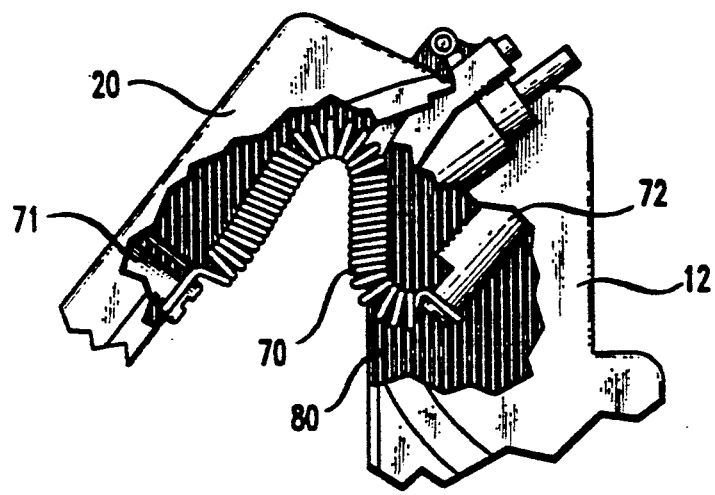

A door, 20, is attached just above the enclosure 80 by means of a rod 84. The door projects the terminal blocks from moisture and contaminants while in a closed position, and gives a craftsperson access to the terminal blocks while in an opened position. As shown in more detail in FIG. 6, a spring 70 is mounted so that one end is attached to a post 71 on an inside surface of the door 20 and the other end is attached to post 72 on the wall 81 of the terminal block enclosure 80. When the door is in an open end position, the spring is fully compressed. Any attempt to close the door will produce a force along the axis of the spring. Since the spring cannot be compressed further, the door will remain in an open position while the craftsperson is at work. In order to close the door, a force must be exerted on the spring at an angle to the axis as illustrated by the arrow to bend the spring as shown in FIG. 7. This force can be applied with a finger.

Figure 8:
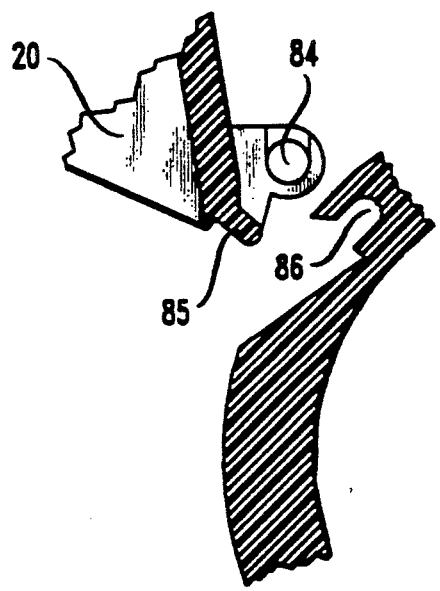
FIGS. 8 and 9 are enlarged end views of a further portion of the terminal.
Figure 9:
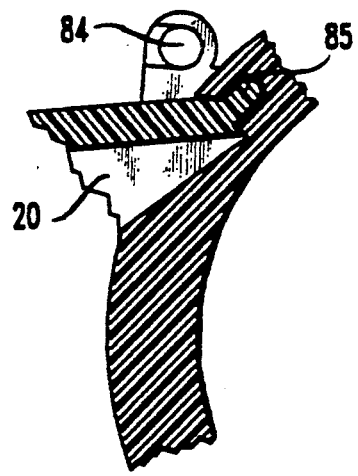

In accordance with another feature, as shown in more detail in FIG. 8, the top edge of the door 20 includes a lip portion, 85, which slides into a groove 86 extending the full length of the top para of the enclosure 80. This feature aids in preventing water from entering the enclosure while the door is in a closed position as shown in FIG. 9. The outer portion of the enclosure also includes a tongue member which fits within a groove around the edges of the inside surface of the door to further prevent moisture penetration in a manner similar to the fit of housings 11 and 12. In both cases, the grooves are deep enough to include a rubber sealing cord for additional sealing.

Returning to FIG. 1, the terminal block contacts are coupled to a plurality of drop wires to various customers, some of which are illustrated as wires 14-17. The bottom of housing 12 includes a separable portion 30, with an array of holes, e.g., 21-24, which permit passage of the wires therethrough. This portion, which may be attached to housing 12 by means of screws (not shown), is discussed in more detail below. The terminal is mounted to a guide wire (not shown) by means of clamps 25 and 26.

Separable portion, 30, will now be discussed with further reference to FIGS. 2-5. This portion includes a pair of plates, shown in an open position in the plan view of FIG. 2 as elements 31 and 32. These plates are typically made of a single sheet of hard plastic with a thickness of approximately 3.12 mm. The plates include two arrays of holes, one array on the plate (31) also visible in FIG. 1 (e.g., 21-24), and the second array on the bottom plate (32)(e.g., 41-44). It will be appreciated that the arrays are mirror images so that when the plates are in a closed (i.e., folded over) position, each hole in an array will be aligned with a corresponding hole in the other array to produce openings through which the drop wires can enter and exit the housing 12 of the terminal. In this particular example, each plate measured approximately 51×394 mm and each hole was approximately 12 mm in diameter. While the plates in this example are made of a single sheet, two separate plates may be employed.

Figure 3:
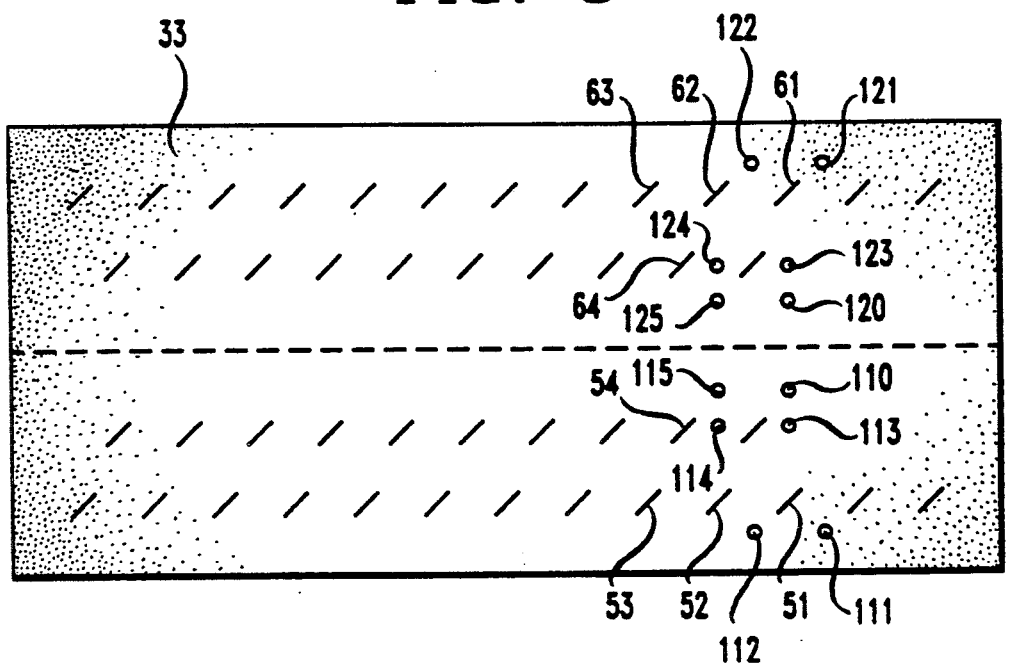
FIG. 3 is a plan view of a further portion of said terminal.
Figure 4:
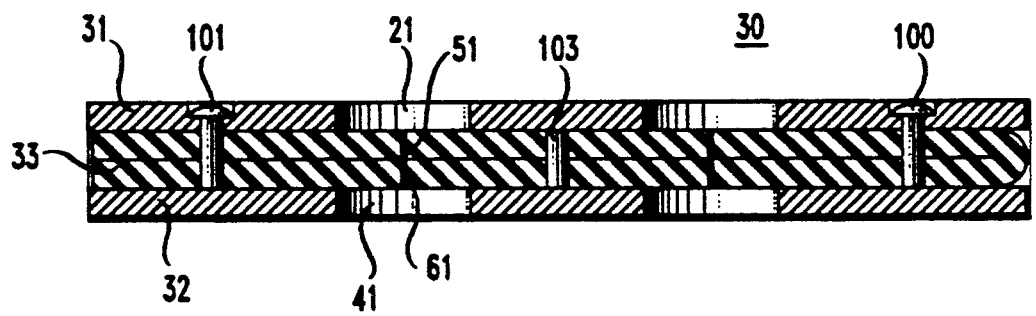
FIG. 4 is a cross-sectional view of a portion of the terminal taken along line 4—4 of FIG. 1.

The separable portion, 30, further includes a flexible sheet, shown in its open position as element 33 in the plan view of FIG. 3 and in its closed position in FIG. 4. The sheet, which in this example is made of flexible PVC (polyvinyl chloride), is approximately 0.8 mm thick and covers essentially the entire surface of the two plates shown in FIG. 2. The sheet includes a first and second array of slits which correspond in number and position to the first and second arrays of holes in the plates. Thus, for example, when sheet 33 is positioned over plate 31, slits 51-54 will overlie holes 21-24, and slits 61-64 will overlie holes 41-44. Each slit in this example was approximately 12 mm in length and was formed at an angle of approximately 45 degrees with the horizontal edge of the sheet.

The plate 31 includes a plurality of pins, only a few of which are shown as 100-105 of the sake of clarity in the illustration. The sheet, 33, also includes a plurality of holes, e.g., 110-115 and 120-125, which fit onto the pins while sheet 33 is in a folded over position so that the sheet is properly positioned relative to the plates. Some of the pins, e.g., 101, are long enough to fit through the sheet 33 and into aligned holes, e.g., 131, in the plate 32 so that when the plates 31 and 32 are closed, the longer pins can be heat staked to clamp the plates as illustrated in FIG. 4.

Figure 5:
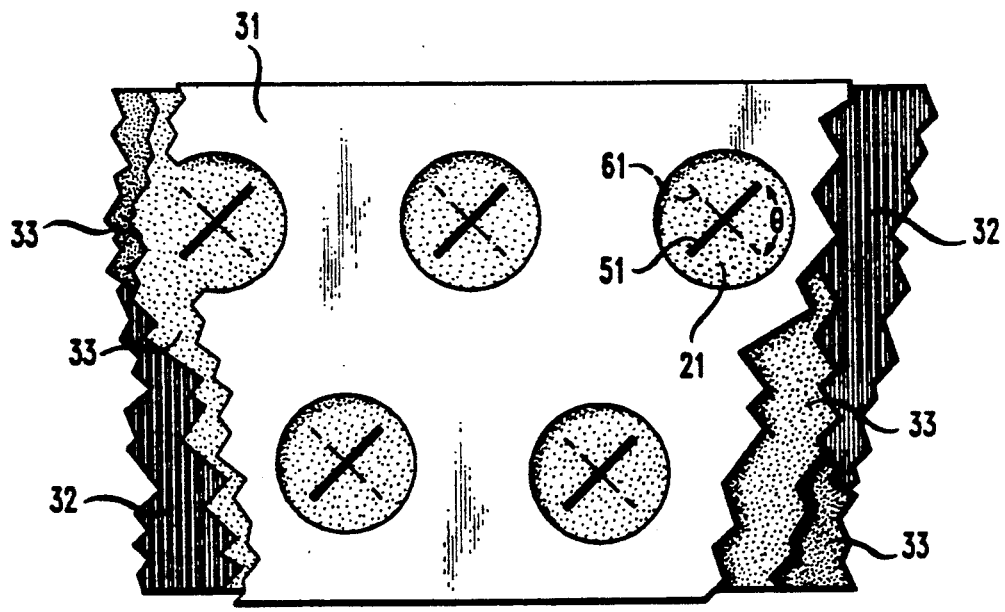
FIG. 5 is a magnified plan view of part of the portion shown in FIG. 4.

While in the closed position, as best seen in FIG. 5, the slits of the first array will overlap at an angle, $\Theta$, with corresponding slits in the second array (e.g., 51 and 61 in FIG. 5). In this example, the angle $\Theta$ is approximately 90 degrees, but generally can have values other than zero and 180 degrees. Preferably the angle is within the range 20-90 degrees.

The crosspoints of the two slits of sheet 33 between each hole in the array of plates 31 and 32 form a tight, narrow opening for the drop wires to pass therethrough. Thus, a more effective seal is provided for the wires against moisture or other contaminants entering the terminal housing.

It will be appreciated that, although a single flexible sheet 33 is shown, the invention can also be practiced by using two separate sheets mounted one above the other.

Figure 10:
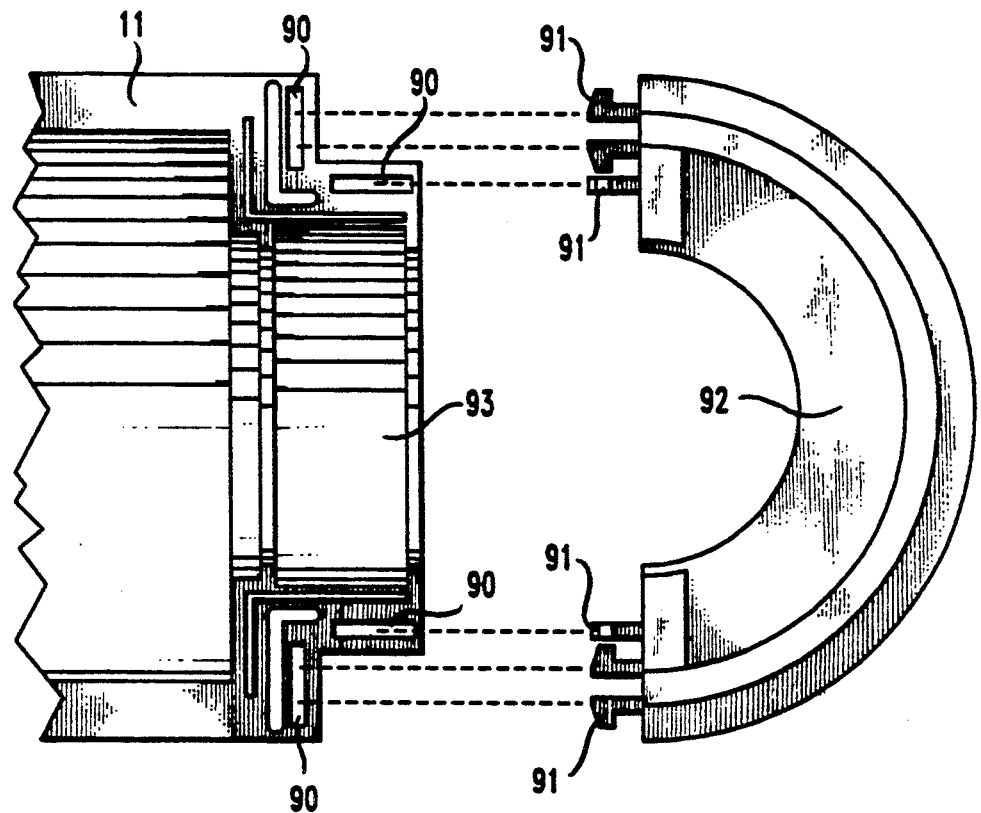
FIGS. 10 and 11 are enlarged perspective views of a still further portion of the terminal.
Figure 11:
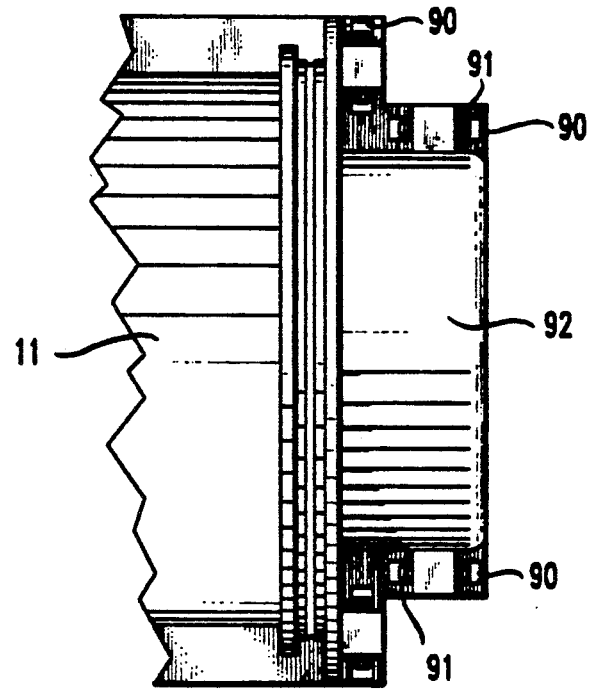
Figure 12:
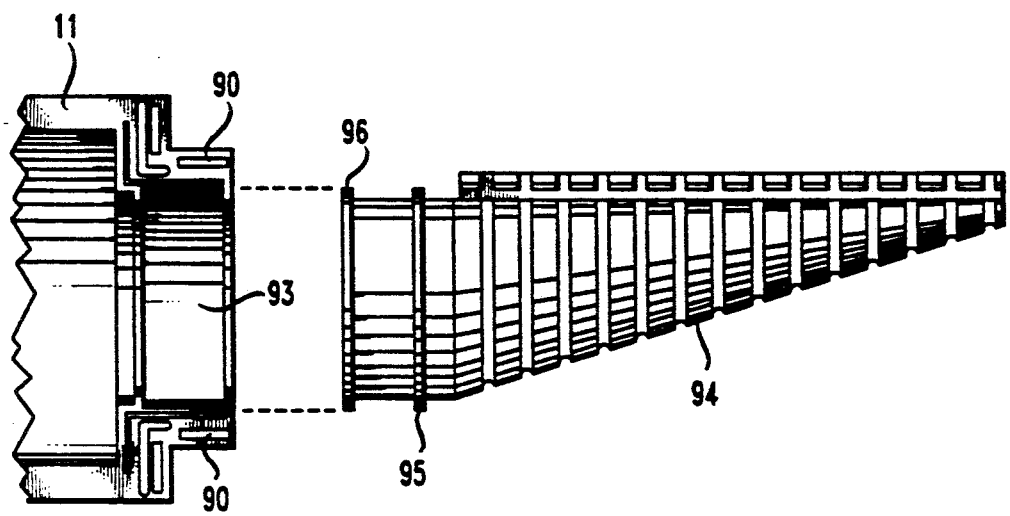
FIGS. 12 and 13 are views of the terminal portion shown in FIG. 10 illustrating the addition of various components.
Figure 13:
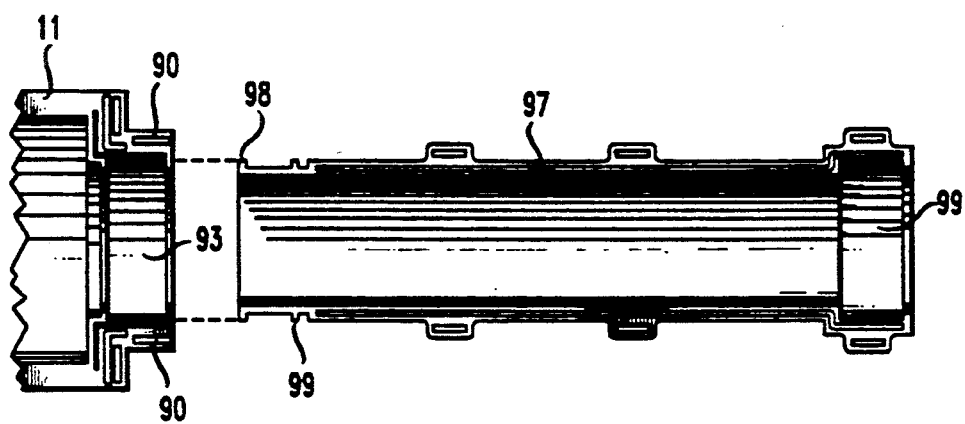

FIGS. 10-13 illustrate a further important feature in the design of the aerial terminal. These figures illustrate in more detail one end portion of the cable housing (11 of FIG. 1). As shown in FIG. 10, the end portion includes openings, e.g., 90, for receiving tabs, 91, from a cylindrical end member 92 in a snap fit. The end portion of the housing, 11, and the end piece 92 both include semicylindrical grooves, groove 93 of the housing being visible in FIG. 10. When piece 92 is snapped into the end of the housing as shown in FIG. 11, the resulting cylindrical groove accommodates a umber of different elements depending on the desires of the customer. For example, a foam seal (19 of FIG. 1) can be inserted in the cylindrical groove. As illustrated in FIG. 12, a boot 94 can be inserted in the groove so that ridges, 95 and 96, on the boot fit within the groove. In some cases the sheath on the cable may get pulled back from the end of the cable housing. In such cases it may be desirable to attach an extension member, 97 of FIG. 13, to the end portion of the cable housing. This can be done by providing ridges 98 and 99 which fit within the groove 93 of the end piece. The extension member can itself have a cylindrical groove 99 at the opposite end to include a boot or foam seal.

It should also be appreciated that since end piece 92 is separate from housing 12, the craftsperson can gain access to the cable 13 by opening housing 12 without distributing the end seals.

Various modifications of the invention will become apparent to those skilled in the art. For example, although an aerial terminal was shown, it should be realized that various features can be used in a standard pedestal terminal. All such variations which basically rely on the teachings through which the invention has advanced the art are properly considered within the scope of the invention.

It will be appreciated in the attached claims that use of the plural designations "plates" or "sheets" is intended to include folded over single plates or sheets, respectively, as well as separate plates or sheets.

We claim:

1. A cable terminal comprising:
   a housing, one portion of which defines an enclosure for including terminal blocks for electrical connection of cable wires to drop wires;
   a door mounted over the enclosure for exposing the terminal blocks when in an opened position and protecting the blocks from moisture when in a closed position; and
   a spring coupled between the enclosure and a surface of the door such that the spring is in a compressed state when the door is in an opened position and thereby prevents the door from being closed, the spring being mounted so that a force exerted on the door produces a force along the axis of the spring which is insufficient to close the door, and only a force applied to the spring at an angle to the axis collapses the spring and permits the door to be closed.

2. The terminal according to claim 1 wherein the door includes a lip portion which slides into the enclosure to provide moisture protection when the door is in a closed position.

3. A cable terminal comprising:
   a housing, which defines at least a portion of an enclosure for a cable; and
   cylindrical end pieces with separable top and bottom members, one of said members being an integral part of the housing at an end thereof, each member including a semi-cylindrical groove such that the end pieces are capable of securing to the housing any one of a plurality of additional members selected from the group consisting of a compliant seal, a boot, and an extension member for the cable.

4. The terminal according to claim 3 further comprising a second housing defining a remaining portion of the enclosure for the cable, wherein the other of said top and bottom members is separate from the second housing to permit opening of the second housing without disturbing the top and bottom pieces.

* * * * *